(12) United States Patent
Iftime et al.

(10) Patent No.: US 11,787,987 B2
(45) Date of Patent: Oct. 17, 2023

(54) ADHESIVE WITH SUBSTRATE COMPATIBILIZING PARTICLES

(71) Applicant: PALO ALTO RESEARCH CENTER INCORPORATED, Palo Alto, CA (US)

(72) Inventors: Gabriel Iftime, Dublin, CA (US); Jessica Louis Baker Rivest, Palo Alto, CA (US); David Mathew Johnson, San Francisco, CA (US); Junhua Wei, Mountain View, CA (US); Eugene Shin Ming Beh, Portola Valley, CA (US)

(73) Assignee: XEROX CORPORATION, Norwalk, CT (US)

( * ) Notice: Subject to any disclaimer, the term of this patent is extended or adjusted under 35 U.S.C. 154(b) by 382 days.

(21) Appl. No.: 16/042,627

(22) Filed: Jul. 23, 2018

(65) Prior Publication Data
US 2020/0024494 A1    Jan. 23, 2020

(51) Int. Cl.
*C09J 163/00* (2006.01)
*B32B 7/12* (2006.01)
(Continued)

(52) U.S. Cl.
CPC .............. *C09J 163/00* (2013.01); *B32B 7/12* (2013.01); *B32B 15/04* (2013.01); *B32B 15/20* (2013.01);
(Continued)

(58) Field of Classification Search
CPC ............. Y10T 428/28; Y10T 428/2848; Y10T 428/2852; Y10T 428/287; Y10T 428/25;
(Continued)

(56) References Cited

U.S. PATENT DOCUMENTS

2002/0198277 A1   12/2002   Sezi
2003/0114598 A1    6/2003   Li et al.
(Continued)

FOREIGN PATENT DOCUMENTS

EP    2687572 A1    1/2014
EP    2787039 A1   10/2014
(Continued)

*Primary Examiner* — Maria V Ewald
*Assistant Examiner* — Ethan A. Utt
(74) *Attorney, Agent, or Firm* — Miller Nash LLP

(57) ABSTRACT

A pair of bonded substrates having a first substrate of a first material, a second substrate of the first material, and an adhesive bonding the first substrate to the second substrate, wherein the adhesive has chemically linked compatibilizing particles compatible with the first and second substrates. A composition of matter has an adhesive having a chemically linked particle network forming a bond between a first substrate and a second substrate, wherein compatibilizing particles in the particle network are compatible with the first and second substrates. A method of joining two structures of identical materials includes preparing first and second structures to expose bare material, applying an adhesive to the bare material on the first and second structures, the adhesive containing compatibilizing particles compatible with the material and the preparing allows interaction between the material and the compatibilizing particles, and curing the adhesive.

9 Claims, 5 Drawing Sheets

(51) Int. Cl.
| | |
|---|---|
| *B32B 15/04* | (2006.01) |
| *B32B 15/20* | (2006.01) |
| *C09J 11/04* | (2006.01) |
| *B32B 27/06* | (2006.01) |
| *B32B 27/20* | (2006.01) |
| *B32B 37/12* | (2006.01) |
| *B32B 38/10* | (2006.01) |

(52) U.S. Cl.
CPC ............ *B32B 27/06* (2013.01); *B32B 27/20* (2013.01); *B32B 37/12* (2013.01); *B32B 38/10* (2013.01); *C09J 11/04* (2013.01); *B32B 2037/1253* (2013.01); *B32B 2262/101* (2013.01); *B32B 2262/106* (2013.01)

(58) Field of Classification Search
CPC ..... Y10T 428/31511; Y10T 428/31515; Y10T 428/29; Y10T 428/2982; Y10T 428/2991; Y10T 428/2998; Y10T 428/24058; Y10T 428/24074; Y10T 428/24091; Y10T 428/24099; Y10T 428/24107; Y10T 428/24116; Y10T 428/24124; Y10T 428/24132; Y10T 428/24942; Y10T 428/2495; Y10T 428/24959; Y10T 428/24967; Y10T 428/24975; Y10T 428/26; Y10T 428/263; Y10T 428/264; Y10T 428/265; Y10T 428/266; Y10T 428/269; Y10T 428/27; Y10T 428/273; B32B 7/00; B32B 7/04; B32B 7/12; B32B 27/00; B32B 27/04; B32B 27/06; B32B 27/08; B32B 27/12; B32B 27/14; B32B 27/18; B32B 27/20; B32B 27/38; B32B 5/00; B32B 5/02; B32B 5/022; B32B 5/024; B32B 5/12; B32B 5/16; B32B 5/22; B32B 5/24; B32B 5/26; B32B 5/28; B32B 5/30; B32B 2264/10; B32B 2264/107; B32B 2264/108; B32B 2264/20; B32B 2264/201; B32B 2264/202; B32B 2264/204; B32B 2264/30; B32B 2264/302; B32B 2264/303; B32B 2264/304; B32B 2264/40; B32B 2264/402; B32B 2363/00; B32B 2605/00; B32B 2605/08; B32B 2605/10; B32B 2605/18; B32B 9/00; B32B 9/005; B32B 9/007; B32B 9/04; B32B 9/045; B32B 9/047; B32B 9/048; C09J 11/00; C09J 11/02; C09J 11/04; C09J 163/00; C09J 163/04; C09J 163/06; C09J 163/08; C09J 163/10; C09J 2203/00; C09J 2203/35; C09J 2203/354; C09J 2204/00; C09J 2204/10; C09J 2204/12; C09J 2204/123; Y10S 977/70; Y10S 977/734; Y10S 977/735; Y10S 977/737; Y10S 977/738; Y10S 977/74; Y10S 977/741; Y10S 977/753; Y10S 977/773; Y10S 977/775; Y10S 977/776; Y10S 977/778; Y10S 977/779; Y10S 977/783; Y10S 977/788; Y10S 977/832; Y10S 977/835; B82Y 30/00; C01B 32/00; C01B 32/15; C01B 32/152; C01B 32/156; C01B 32/182; C01B 32/194; C01B 32/198; B82B 1/00; B82B 1/005; B82B 1/008

USPC ....... 428/343, 354, 355 R, 355 EP, 323, 413, 428/414, 357, 402, 403, 407, 105, 107, 428/109–114, 212–216, 219, 220, 332, 428/334–337, 339–341, 408, 430; 977/700, 734, 735, 737, 738, 740, 741, 977/753, 773, 775, 776, 778, 779, 783, 977/788, 832, 835

See application file for complete search history.

(56) References Cited

U.S. PATENT DOCUMENTS

| | | |
|---|---|---|
| 2005/0090570 A1 | 4/2005 | Lyu et al. |
| 2008/0227882 A1 | 9/2008 | Hahnfeld et al. |
| 2014/0275323 A1* | 9/2014 | Thibodeau ............... C09C 1/42 522/177 |
| 2015/0344666 A1* | 12/2015 | Macosko ............... B32B 27/12 428/413 |
| 2016/0082691 A1* | 3/2016 | Restuccia ............... B32B 25/16 442/377 |
| 2017/0260351 A1 | 9/2017 | Hayward et al. |
| 2019/0153190 A1 | 5/2019 | Seo et al. |

FOREIGN PATENT DOCUMENTS

| | | |
|---|---|---|
| WO | 2009048663 A2 | 4/2009 |
| WO | 2012095447 A1 | 7/2012 |
| WO | 2016178954 A1 | 11/2016 |

\* cited by examiner

ADHESIVE WITH SUBSTRATE COMPATIBILIZING PARTICLES

FIELD OF THE INVENTION

This disclosure relates adhesives, more particularly to adhesives for bonding similar materials.

BACKGROUND

Adhesives provide a preferred solution for joining parts because they produce low-cost, corrosion-free bonding and eliminate the need for failure prone through-holes used with fasteners in the joined materials. Current state of the art adhesives provide only limited bonding strength. The weakest section of the assembled structure occurs at the interface between the parts. Catastrophic failures often occur at these locations.

The primary factors responsible for the limited mechanical strength of the bonded materials with the current state of the art, particle reinforced adhesives include: poor particle-polymer interfaces; no inter-particle connections except for uncontrolled aggregates; and substrate adhesion provided only by polymer interaction with the bonded surfaces.

A need exists for improved bonding strength of industrially relevant materials used in fabrication of auto, vehicle, and aircraft parts.

SUMMARY

One embodiment is a pair of bonded substrates having a first substrate of a first material, a second substrate of the first material, and an adhesive bonding the first substrate to the second substrate, wherein the adhesive has chemically linked particles compatible with the first and second substrates. Another embodiment is a composition of matter which has an adhesive having a chemically linked particle network forming a bond between a first substrate and a second substrate, wherein the particles in the particle network are compatible with the first and second substrates.

Another embodiment is a method of joining two substrates of identical materials and includes preparing first and second substrates to expose bare material, applying an adhesive to the bare material on the first and second substrates, the adhesive containing particles compatible with the material and the preparing allows interaction between the material and the particle, and curing the adhesive.

DETAILED DESCRIPTION OF THE EMBODIMENTS

The embodiments here disclose a high-performance adhesive that bonds identical materials with several important features. The embodiments provide direct chemical bonding of compatibilizing particles, where a compatibilizing particle is a particle, typically in a matrix, that has similar physicochemical characteristics to the substrates, materials or structures being bonded. One way in which the compatibilizing particles enhance the bonding between substrates is through Van der Waals interactions. In order to maximize the Van der Waals bonding between substrates and particles from the adhesive particles are selected that have strong induced-dipole/induced-dipole interactions with the substrate material, and in some embodiments the particles have a shape that maximizes surface area interaction with the substrates. A possible guide for selecting particles materials with strong induced-dipole/induced-dipole interactions with the substrates to be bonded is that the material composition of the particles and of the substrates are identical, or when that is not possible, the compatibilizing particles contain chemical elements that are similar to the corresponding compatible substrate. The chemical composition of the particles may or may not be identical to the corresponding compatible substrate.

For the purpose of this discussion, "similar chemical elements" means that the particles contain at least the key chemical element(s) present in the corresponding compatible substrates. There will inevitably be surface differences, such as oxidation and surface functionalization that will alter the material composition, but the base material should be either identical or contain similar chemical elements. The term substrates, as used here, includes any form of the materials, substrates and structures being bonded. The embodiments create a chemically linked particle network that prevents particle separation during impact and stress. The chemically linked particle network includes the materials in the structures being bonded.

Of particular interest, in applications like automotive and aerospace is bonding of structural materials. Structural materials are those materials that are used primarily for their mechanical properties, which are generally used to construct the load bearing parts of building constructions.

The embodiments have distinctive features that enhance the bonding strength achieved here. The chemically linked networks of reinforcing particles enable enhanced cohesive strength that prevents particle separation. The physical and/or chemical bonding of the compatibilizing particles in the adhesive maximize the adhesive strength and enhances adhesive compatibility and affinity to the bonded substrates.

Figure 1:
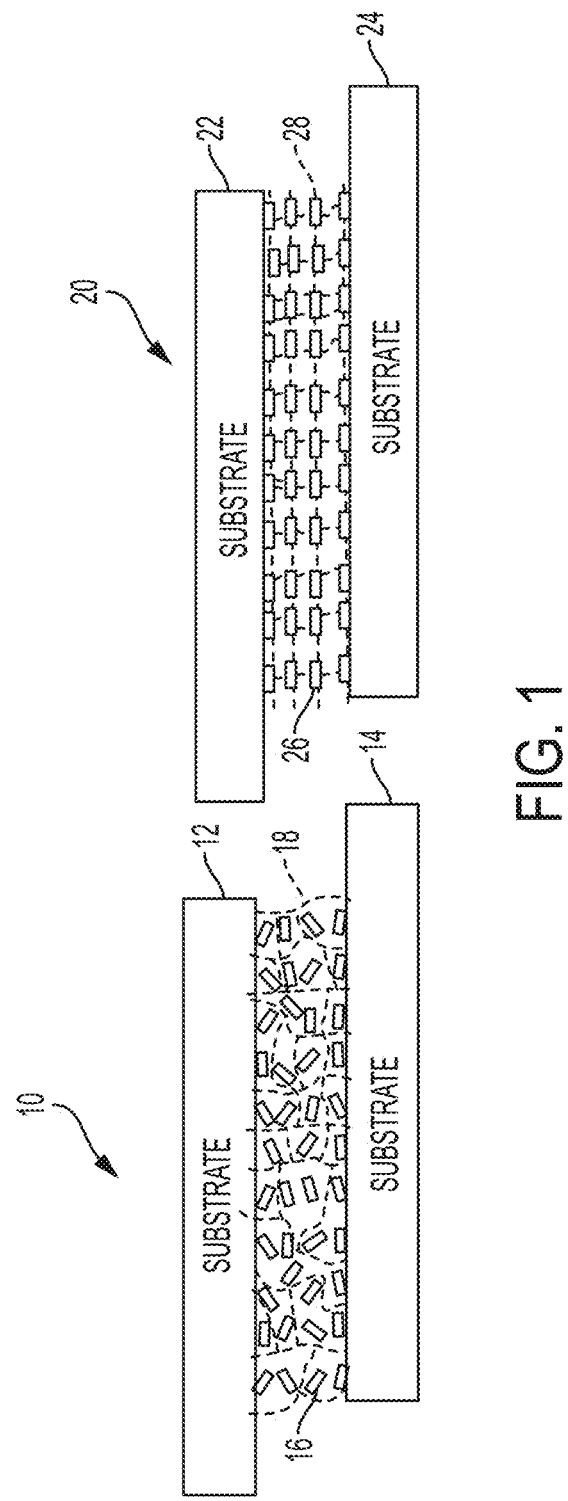
FIG. 1 shows a comparison of current adhesives and chemically linked particle adhesives in accordance with the embodiments here.

FIG. 1 shows a comparison of current state of the art adhesives to a representative adhesive in accordance with the embodiments disclosed here. At 10, the pair of bonded substrates 12 and 14 bond through weak polymer chains, such as 18. Randomly dispersed reinforcing particles 16 stop the polymer chain growth at the particle/polymer interface. This causes the current adhesives to have generally limited cohesion strength. In addition, the free particles are not bonded to the nearby epoxy groups and deformations due to stress can cause permanent dislocation of the particle from the polymer matrix, eventually causing failure. They enable only a limited improvement of the cohesive strength when compared to the polymer material alone.

In contrast, at 20 the pair of bonded substrates 22 and 24 have particles directly bonded to the substrates, where the particles have identical or similar characteristics to the substrates. As discussed above, for the purposes of this discussion, "similar" means that the particle materials of the particles and of the substrates are identical of, if this is not possible, then the particles contain at least the key chemical element(s) present in the corresponding compatible substrates. Further, the particles form a chemically linked particle network. Chemical linking bonds particles to both other particles and the epoxy matrix, which maximizes the interaction between the adhesive and the substrates to be bonded. Under mechanical and thermal stresses the network may deform, but the strong bonds between components resists any permanent deformation and no permanent deformation results. As a result, the embodiments here have outstanding thermal-mechanical performance when compared with current adhesives.

The particles may have any shape, although non-spherical particles such as plates, rods, fibers, or randomly-shaped particles, typically have higher surface area available for bonding interactions with the substrates. The bonding interactions may consist of physical and/or chemical bonding. Electrostatic or dipolar interactions over the larger surface areas of plate-like particles compared to spherical particles may further increase the adhesion strength between the particles and substrates.

As an example, when bonding carbon fiber reinforced polymer (CFRP) substrates, the compatibilizing particles will typically be graphene or graphene derivatives. The carbon fibers in CFRP typically consist of domains of graphitic carbon, meaning it has parallel graphene layers. They achieve their extraordinary strength from two main interactions: interplane, or π-π interaction between the stacked graphene sheets; and in-plane, or fused, carbon-carbon linked sheets. The chemically linked graphene networks further enhance adhesion onto CFRP substrates by physical linking of graphene platelets to the graphitic structures of the carbon fibers through 7E-7E interactions.

Figure 2:
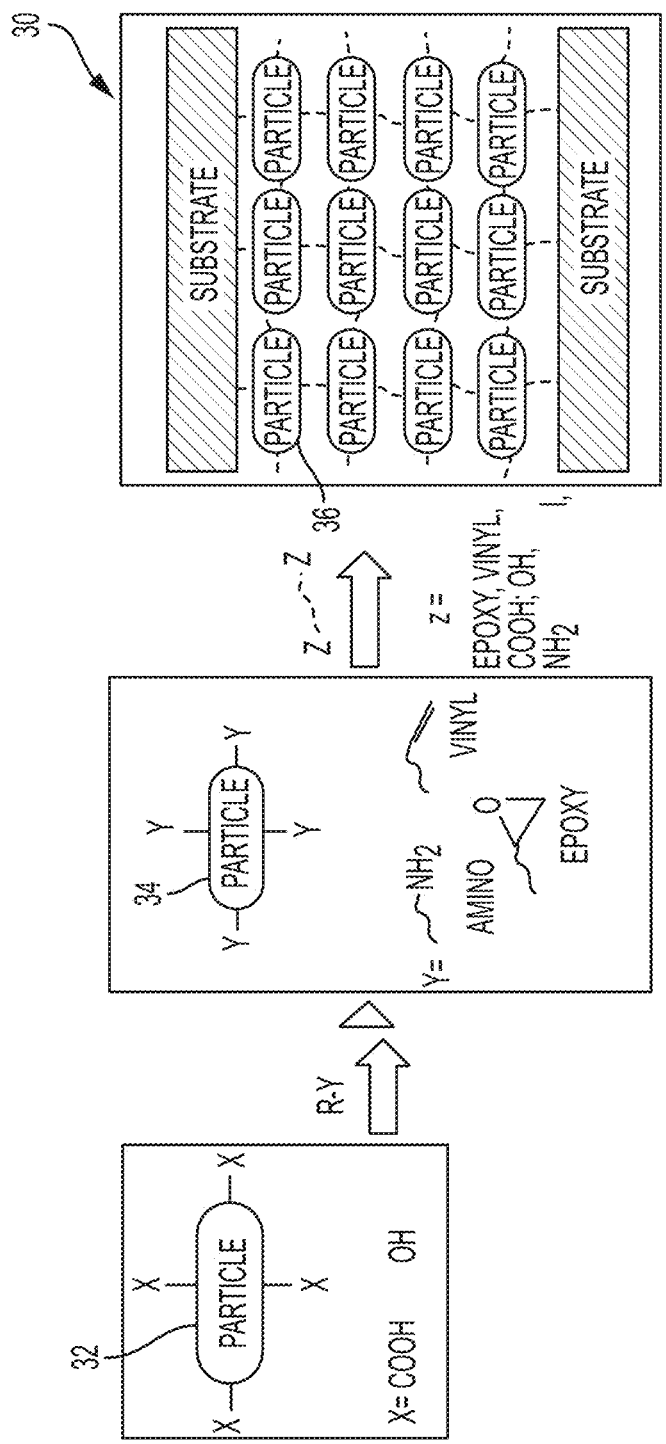
FIG. 2 shows a schematic representation of an embodiment of process for fabricating particles and an adhesive incorporating those particles.

FIG. 2 shows a schematic representation of an embodiment of a process 30 for fabricating particles and an adhesive incorporating these particles. Appropriate functional groups functionalize the particles (Y) by reacting with the chemical linkers to produce the cured adhesive having chemically linked particle networks. Example functional groups include amino, vinyl, and epoxy reactive groups. Existing, generally available, initial reactive groups X (COOH or OH, as examples) at 32 react onto particles fabricated from precursors having reactive molecules (R-Y) that contain the desired linking functional groups listed above. The functionalized particles at 34 are then used to prepare an adhesive by mixing materials that contain coupling function groups Z. Mixing can be achieved by any technique used in the adhesive and particle-filled polymer formulations industries. This may include mechanical and magnetic stirring, high shear mixing, planetary mixers, attritors and others. Curing results in the chemically linked particle networks bonding a pair of substrates at 36.

Curing is dependent on the nature of the functional groups onto particles and that of the linker materials containing the Z groups. Curing may be achieved at room temperature by reaction between epoxy and amino groups such as typically encountered with two part epoxy adhesives. In this case, the epoxy group is present in either particle of the Z function and amino groups are present on the corresponding counterpart. Curing may be achieved by heating at a temperature above the ambient temperature with epoxy formulations containing a slow curing initiator such as an ionic liquid or organic tertiary amines. Curing by heating above ambient temperature is also suitable for formulations with groups containing vinyl groups. In this case, both the particles and the Z groups onto the linkers contain polymerizable vinyl groups. The formulation also includes a radical initiator such as benzoyl peroxide (BPO) or Azobisisobutyronitrile (AIBN). Curing may be also achieved by using UV light. In this case an UV photoinitiator is required for curing initiation. This approach is suitable when bonding transparent substrates such as glass.

The initial particles containing COOH and/or OH functional groups are commercially available from several sources. These include: silica ($SiO_2$) with functional groups of amino, COOH, OH, epoxy and others; alumina ($Al_2O_3$) with amino or COOH; titania (($TiO_2$) with amino or COOH; magnesium oxide (MgO) in the form of water dispersible particles or nanoparticles by sol-gel processes like $SiO_2$ nanoparticles; and graphene oxide functionalized particles are widely available.

The above discussion discloses a general adhesive having chemically-linked, substrate compatibilizing particles. Implementation may be specific to the substrates being bonded. The selection of the particles differentiates the embodiments here from the current state of the art adhesives. Particles are selected to match the thermal and mechanical, or thermomechanical properties of the substrates being bonded. Thermal properties can include thermal conductivity, coefficient of thermal expansion, and heat capacity. Mechanical properties can include, but are not limited to, shear strength, young's modulus, tensile strength, compressive strength, and hardness. Particles can also be selected in order to minimize potential for corrosion by matching the chemical composition of the substrate. The mechanical and thermal (thermomechanical) properties of the particles themselves may be superior to those of the substrates being bonded, but concentrations and the compatibilizing epoxy matrix will be selected so that the adhesive mixture has properties as close as possible and ideally to match the substrate being bonded. In some embodiments, the compatibilizing particles consist of metal oxides of the same materials as the substrates being bonded.

For example, the particles used for enhanced bonding of various materials includes: for CFRP to CFRP, functionalized graphene particles that may be obtained from any suitable graphene precursor. One particular example include graphene oxide functionalized particles. Any other graphene precursor that can be used for fabrication of functional graphene particles is suitable for the present invention; aluminum to aluminum, aluminum oxide ($Al_2O_3$) particles; glass to glass or fiber reinforced polymers (FRP) to FRP, silicon oxide ($SiO_2$) particles; titanium to titanium, titanium dioxide ($TiO_2$); and magnesium to magnesium, magnesium oxide (MgO).

Figure 3:
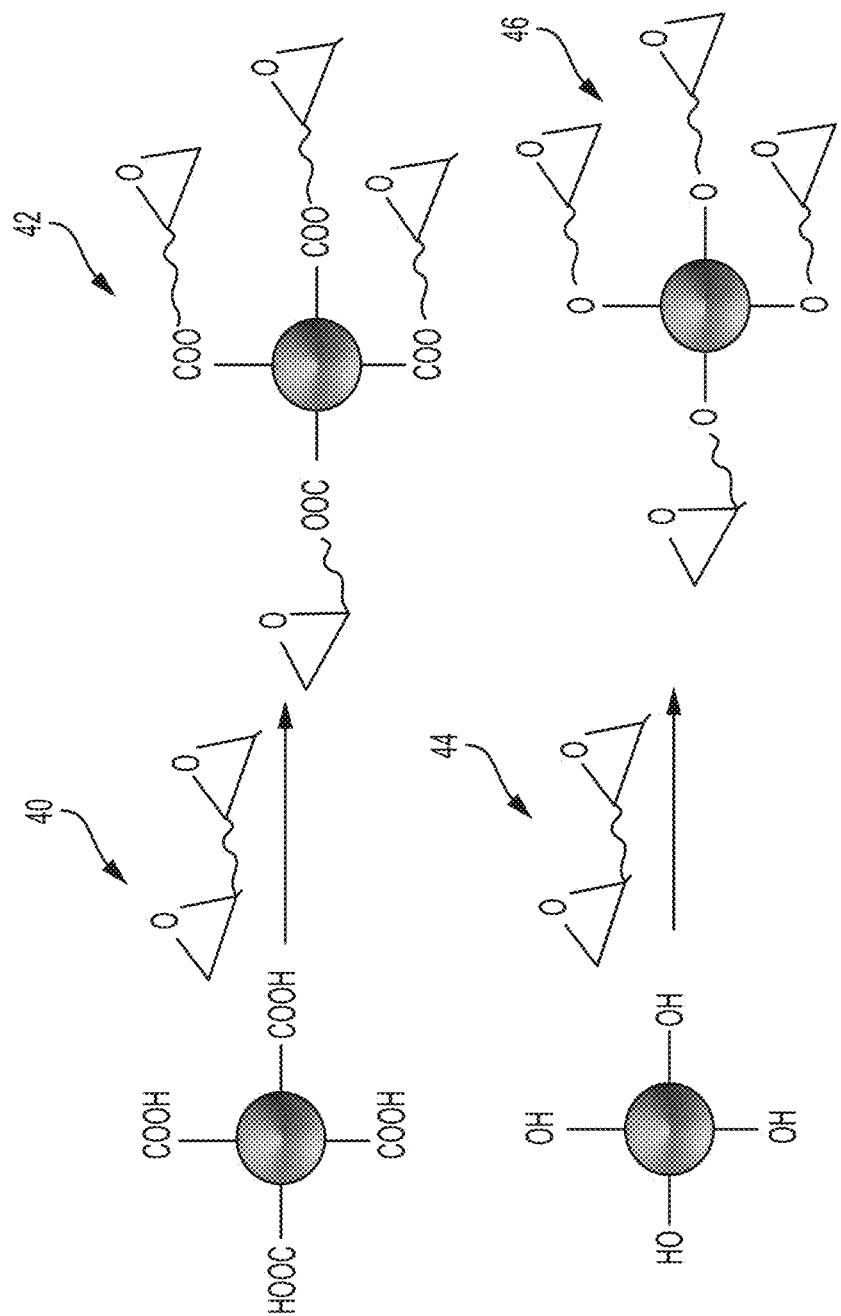
FIG. 3 shows an embodiment of epoxy functionalized particles produced by reaction of COOH and OH primary particles with difunctional epoxy precursors.
Figure 4:
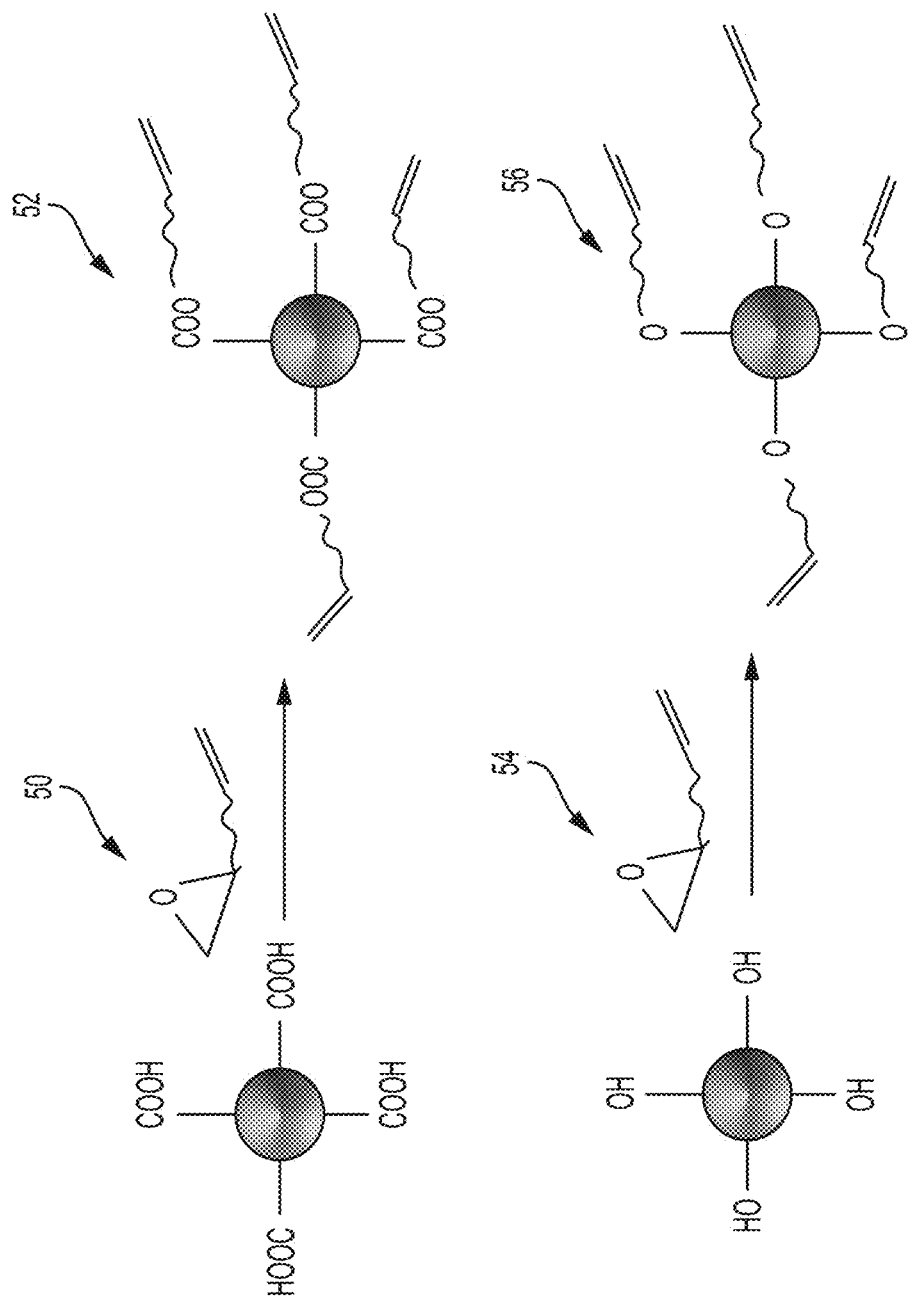
FIG. 4 shows an embodiment of vinyl functionalized particles produced by reaction of COOH and OH primary particles with a dual epoxy and vinyl functionalized precursors.
Figure 5:
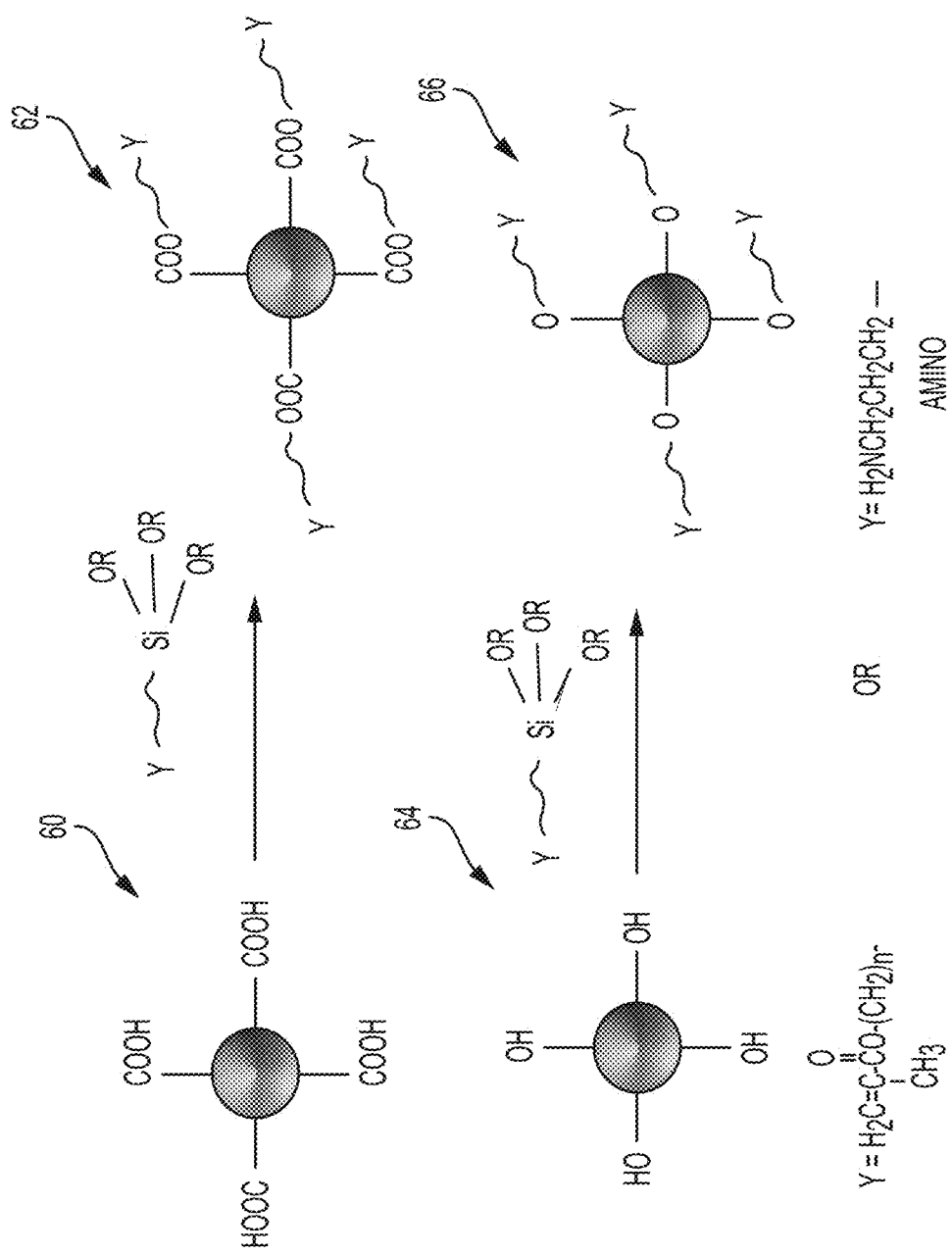
FIG. 5 shows an embodiment of silane coupling agents containing reactive functional groups.

Many chemical processes for introduction of functional groups use the OH or COOH primary functional groups present on particle surfaces at the time of their preparation. The chemical processes for fabrication of the Y functionalized particles, such as amino, vinyl and epoxy, are generally similar. The nature of the starting particles does not influence the chemical processes in any significant way. FIGS. 3-5 show examples of chemical processes suitable for fabrication of Y functionalized particles.

FIG. 3 shows epoxy functionalized particles 42 and 46 produced by reaction of COOH, 40, and OH, 44, primary particles with difunctional epoxy precursors, respectively.

FIG. 4 shows vinyl functionalized particle 52 and 56, produced by reaction of COOH, 50, and OH, 54, primary particles with dual epoxy and vinyl functionalized precursors, respectively. The vinyl function may include aliphatic alkenes, aromatic alkenes, acrylates, and methacrylates, among others.

FIG. 5 shows introduction of various functional groups by reacting COOH at 60 and OH functions at 62 with silane coupling agents containing suitable reactive functional groups, such a vinyl in the form of acrylates and methacrylates at 60 and 64, and amino at 62 and 66. Silane coupling agents are widely available.

The two substrates made of identical materials are joined by first preparing their surfaces to expose bare material, such as by surface etching. Then the adhesive is applied to the bare materials, the two substrates are brought together, optionally pressed against each other and the adhesive is cured. In order to ensure a consistent bond line, a small amount of spherical glass beads may also be mixed with the adhesive. Substrate preparation can be achieved in multiple ways. This include mechanical abrasion approaches such as sanding or sand blasting, surface cleaning with organic solvents or aqueous cleaners, chemical etching such as with chromic acid (as per ASTM D2651), electrochemical anodization, photochemical methods with UV/ozone treatment, and plasma etching.

Example 1

An adhesive containing epoxy functionalized graphene particles dispersed in an epoxy base and hardener was fabricated in a similar fashion as disclosed in U.S. patent application Ser. No. 15/850,871, filed Dec. 21, 2017. Functionalized graphene oxide is produced by dispersing graphene oxide into a solvent, and mixing the dispersed graphene oxide with a reactive molecule containing at least one epoxy function group and a secondary function group selected from vinyl, acrylate, methacrylate, and epoxy to form a solution. An activation agent was added to the solution which is then heated and stirred. The solution is cooled and the particles of functionalized graphene oxide were separated from the solution. The functionalized graphene oxide is then mixed with a resin precursor and optional solvent to produce a functionalized graphene solution having functional groups identical, or nearly identical, to a polymer precursor material. A curing initiator may be added to the resin solution.

Sample 1 involved sanding two CFRP substrates to expose bare carbon fiber material and 300-micron glass beads were dispersed in the adhesive solution to control bond thickness and the solution was applied to the substrates. The two substrates were joined together with 0.5×1 inches of overlapping area in this example. The solution was then cured at room temperature.

Preliminary lap shear strength tests were performed according to ASTM D5868 (American Society for Testing and Materials, Standard D5868 "Standard Test Method for Lap Shear Adhesion for FRP Bonding). A comparative sample consisted of just the epoxy base and hardener without the graphene particles. Results in table 1 shows an increase of the strength of sample 1 vs. the comparative sample.

| Adhesive | Lap Shear Strength (psi) |
|---|---|
| Comparative sample | 1740 |
| Sample 1 | 2132 |

Additional bonding strength increases may be obtainable by optimizing the adhesive and bonding procedures. For example, it was observed that coated samples made with graphene particle formulations have large numbers of voids, due both to the presence of air bubbles incorporated during high shear particle dispersion processes, and for the need to use solvents to reduce adhesive viscosity. These defects are not found with commercial, non-particle based adhesives. Using a high vacuum and reduced, and if possible, eliminated, solvent in the formulation will further increase the bonding strength.

In further testing, Sample 1 and the comparative sample were examined under a scanning electron microscope (SEM) after being pulled by the tensile test. The comparative sample showed exposed carbon fibers, meaning the epoxy base has simply delaminated from the surface of the carbon fiber. In contrast, Sample 1 showed large amounts of graphene composite left over the surface of the broken bond. This demonstrates strong adhesion of the graphene linked network onto the carbon fibers. This proves enhanced adhesion strength enabled by the graphene particles that are similar or compatible with the carbon fibers present in the CFRP bonded substrates.

One should note that while the above example was for CFRP substrates and graphene particles in the adhesive, the other formulations for the other substrates will have the same performance improvements. No intention to limit the scope of the claims to this particular material system is intended nor should it be implied.

In this manner, enhanced bonding between similar substrates is achieved over state of the art adhesives. The chemically bonded network of particles bond directly to the surfaces of the substrates, providing maximum adhesive strength. The chemically linked networks of reinforcing particles prevent particle movement during impact and stress. The presence of chemically and mechanically compatible reinforcing particles matching the substrates allows for outstanding thermo-mechanical performance.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A pair of bonded substrates, comprising:
   a first substrate of a first material;
   a second substrate of the first material; and
   an adhesive bonding the first substrate to the second substrate, wherein the adhesive has a matrix and substrate compatibilizing chemically linked particles, each compatibilizing chemically linked particle directly bonded to the first and second substrates, comprising a metal oxide of the first material, the compatibilizing chemically linked particles comprising:
   a primary particle having primary functional groups comprising at least one of carboxyl groups or hydroxyl groups on a surface of the primary particle; and
   functional groups bonded to the primary functional groups that allow the compatibilizing particle to be similar to, compatible with, and directly bonded to the first and second substrates, and cause the particle to form a chemically linked particle network between the particles and chemical bonds to the matrix.

2. The pair of bonded substrates of claim 1, wherein the compatibilizing chemically linked particles comprise particles having thermomechanical properties that match the thermomechanical properties of the first and second substrates.

3. The pair of bonded substrates of claim 1, wherein the first material consists of carbon fiber reinforced polymer (CFRP) and the particles consist of graphene oxide functionalized particles.

4. The pair of bonded substrates of claim 1, wherein the first material consists of aluminum and the particles consist of aluminum oxide.

5. The pair of bonded substrates of claim 1, wherein the first material consists of one of either fiberglass reinforced polymers (FRP) or glass, and the particles consist of silicon oxide.

6. The pair of bonded substrates of claim 1, wherein the first material consists of titanium and the particles consist of titanium oxide.

7. The pair of bonded substrates of claim 1, wherein the first material consists of magnesium and the particles consist of magnesium oxide.

8. The pair of bonded substrates of claim 1 wherein the compatibilizing chemically linked particles are surface functionalized with epoxy groups and have a linker material that contains either amino or epoxy groups.

9. The pair of bonded substrates of claim 1 wherein the compatibilizing chemically linked particles are surface functionalized with vinyl bonds and have a linker material that contains vinyl groups.

* * * * *